(12) United States Patent
Sioma

(10) Patent No.: US 8,416,550 B1
(45) Date of Patent: Apr. 9, 2013

(54) SOLID STATE BREAKER CIRCUIT FOR DIRECT CURRENT APPLICATIONS

(76) Inventor: Edward M. Sioma, Levittown, PA (US)

( * ) Notice: Subject to any disclaimer, the term of this patent is extended or adjusted under 35 U.S.C. 154(b) by 0 days.

(21) Appl. No.: 13/310,677

(22) Filed: Dec. 2, 2011

(51) Int. Cl.
*H02H 3/22* (2006.01)

(52) U.S. Cl. ........................ 361/91.1; 361/111

(58) Field of Classification Search ............... 361/91.1, 361/111, 115
See application file for complete search history.

(56) References Cited

U.S. PATENT DOCUMENTS

| 6,927,958 B2* | 8/2005 | Nostrand | 361/58 |
| 2008/0151444 A1* | 6/2008 | Upton | 361/31 |

* cited by examiner

*Primary Examiner* — Danny Nguyen
(74) *Attorney, Agent, or Firm* — LaMorte & Associates, P.C.

(57) ABSTRACT

A solid state circuit breaker for disrupting the flow of direct current. A power transistor is used in series with the direct current. The power transistor disrupts the direct current only when it is in an off state. A first optoisolator and a second optoisolator are provided. The second optoisolator selectively alters the power transistor to its off state. The first optoisolator selectively controls the second optoisolator. A threshold resistor is provided through which the direct current passes. The threshold resistor creates a voltage differential. The voltage differential is supplied to the first optoisolator and activates the first optoisolator if the voltage differential is greater than a selected threshold voltage.

15 Claims, 4 Drawing Sheets

SOLID STATE BREAKER CIRCUIT FOR DIRECT CURRENT APPLICATIONS

BACKGROUND OF THE INVENTION

1. Field of the Invention

In general, the present invention relates to breaker circuits and other circuit configurations that are used to prevent an over-voltage condition between a power supply and circuits that are powered by that power supply. More particularly, the present invention relates to circuit breaker circuits and other such circuit configurations that can be used in direct current applications.

2. Prior Art Description

In the recent past, the strongest direct circuit source a person would typically encounter would be the twelve-volt electrical systems of an automobile. However, with the advent of hybrid automobiles, electric automobiles, solar panels and the like, there now exist many common direct current applications that can carry over one-hundred volts.

Along with the increase of direct current applications has come the need for direct current circuits to safely control the flow of electricity. One of the most basic control circuits is a circuit breaker that prevents power surges from damaging downstream components. The prior art is replete with various circuit breaker circuits that are designed for alternating current applications. However, few are capable of operating with direct current. Circuits that are designed for direct current tend to be current shunt monitor circuits, such as crowbar circuits. Such circuits operate by putting a short circuit or low resistance path across a voltage source. This is typically achieved using a thyristor, silicon controlled rectifier or thyratron. Once the short is achieved, the flow of current is stopped by the blowing of a line fuse. As a consequence, the line fuse must be replaced before the downstream circuits can again operate.

Due to the components used in prior art current shunt monitor circuits, such circuits cannot operate in applications where the direct current is in excess of sixty volts. Consequently, such circuits are not practical in the most common applications of electric automobiles and solar power generators.

In direct voltage applications, over sixty-volts, electro-mechanical breakers are commonly used. However, such devices are prone to contact welding, arcing and sparking. As such, there are safety concerns in many applications where such failures can start fires.

A need therefore exists for a solid state circuit breaker that does not use electro-mechanical parts, yet can operate in applications in excess of one-hundred volts DC. This need is met by the present invention as described and claimed below.

SUMMARY OF THE INVENTION

The present invention is a solid state circuit breaker for disrupting the flow of direct current should the direct current surpasses a predetermined threshold current. The circuit breaker utilizes a power transistor sufficiently rated for the voltages that are to be encountered. The power transistor is used in series with the direct current. The power transistor has an on state and an off state that can be selectively controlled. The power transistor disrupts the direct current only when it is in its off state.

A first optoisolator and a second optoisolator are provided. The second optoisolator selectively alters the power transistor between its on state and off state depending upon the activation or deactivation of the second optoisolator. The first optoisolator selectively controls the second optoisolator. The first optoisolator contains a first LED and a first transistor. The first LED has a minimum operating voltage. A threshold resistor is provided through which the direct current passes. The threshold resistor creates a voltage differential. The voltage differential is supplied to the first LED and causes the first LED to activate if said voltage differential is greater than the minimum operating voltage of the first LED.

Using this threshold detection, the first optoisolator activates the second optoisolator when a high differential voltage is detected. The second optoisolator controls the power transistor and disrupts the flow of current through the circuit breaker.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention circuit breaker design can be embodied in many direct current applications, the embodiment illustrated shows the circuit breaker design isolated in a simple loop to facilitate a simple explanation. This embodiment is selected for its simplicity and is merely exemplary. Accordingly, the illustrated application should not be considered a limitation when interpreting the scope of the appended claims.

Figure 1:
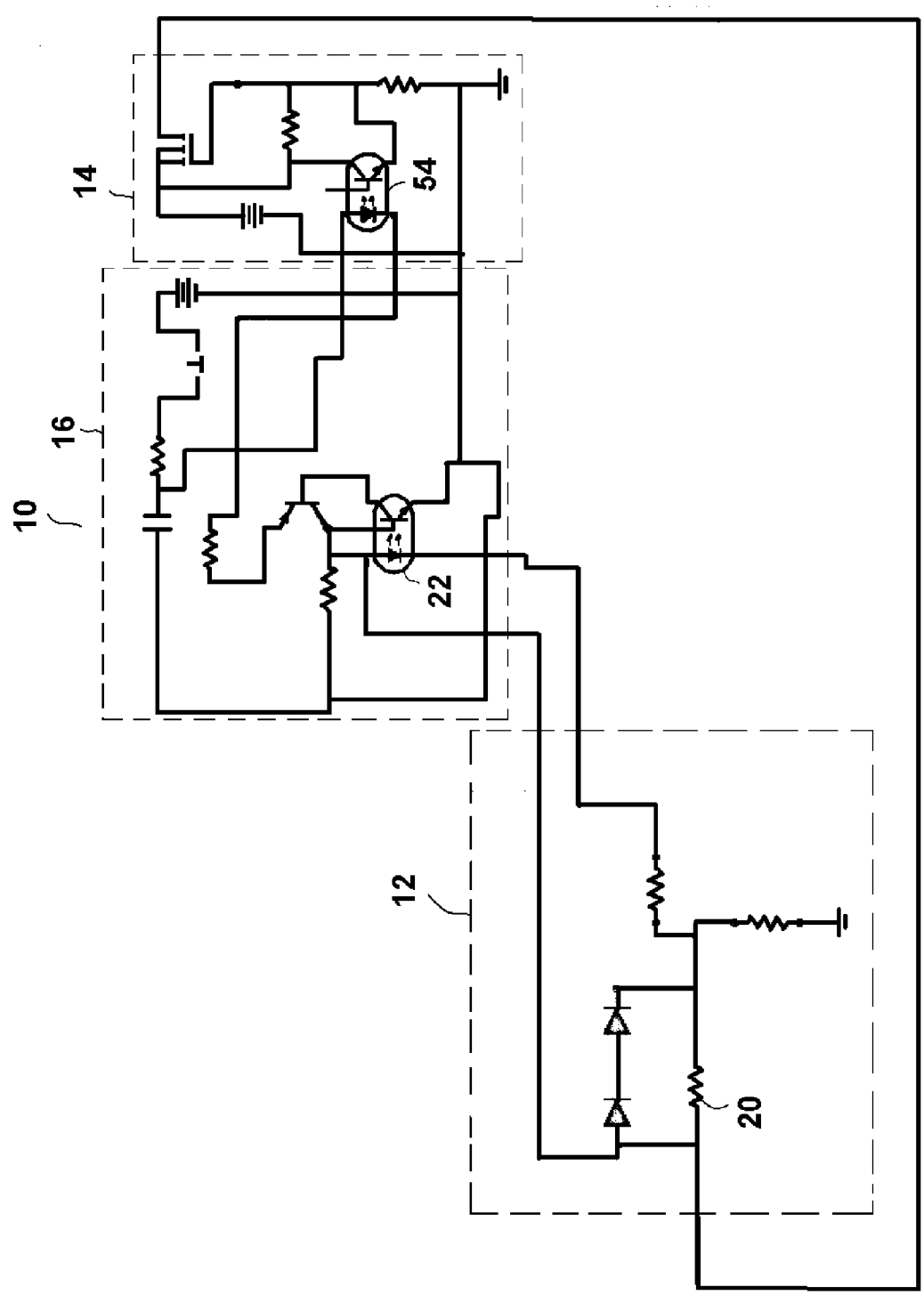
FIG. 1 is a schematic showing an exemplary embodiment of the present invention circuit breaker.

Referring to FIG. 1 a solid state circuit breaker design 10 is shown, having a power input section 12, a power output section 14 and an interposed regenerative section 16. As will be explained, the circuit breaker design 10 operates with direct current in voltage ranges that can exceed one hundred volts. The circuit breaker design 10 is therefore applicable for use in electric vehicles and solar panel applications where direct current in the range of 100 volts-300 volts is commonplace. The circuit breaker design 10 is solid state and has no components that can weld, spark or arc with such high voltages of direct current. Furthermore, the tripping current threshold of the circuit breaker design 10 can be customized to occur at specific current levels and can be set either for an instantaneous trip or for a time delayed trip.

Figure 2:
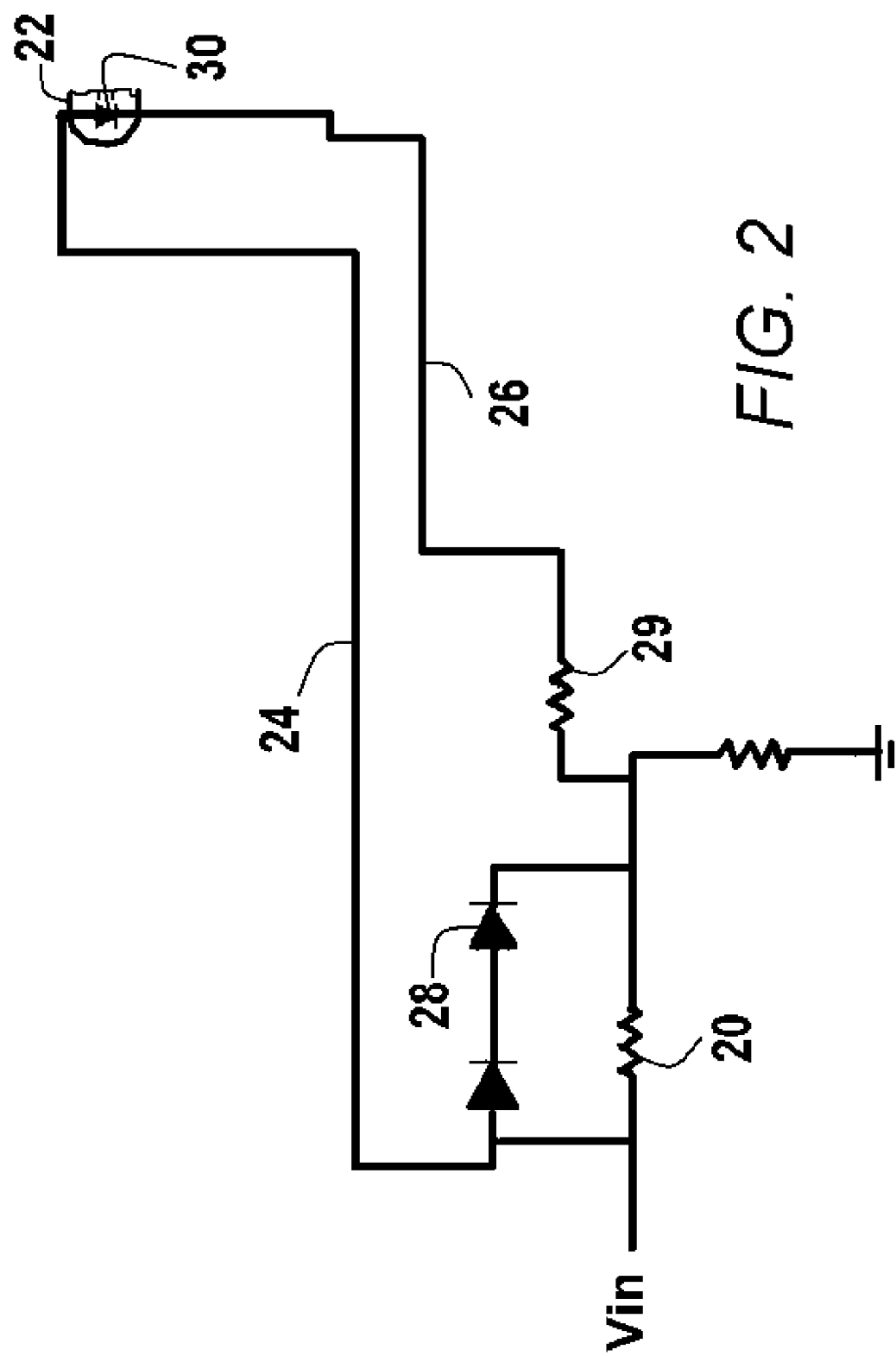
FIG. 2 is an enlarged view of the power input section of the circuit breaker shown in FIG. 1.

Referring to FIG. 2 in conjunction with FIG. 1, it can be seen that the power input section 12 of the circuit breaker design 10 receives the incoming DC voltage Vin. The power input section 12 utilizes a threshold resistor 20 that has a resistance value that produces a volt difference as the incoming voltage Vin is directed across the threshold resistor 20. This volt difference is carried to a first optoisolator 22 utilizing a first lead 24 on one side of the threshold resistor 20 and a second lead 26 on the opposite side of the threshold resistor 20. Two protective diodes 28 are also used to span the threshold resistor 20 to prevent any backflow through the threshold resistor 20. Assuming that the overall system is operating at 144 volts, a 330 milliohm threshold resistor at a load current of 1.80 amperes would develop a 0.59 volt difference between the two leads 24, 26. A calibration resistor 29 is set in the second lead 26.

Figure 3:
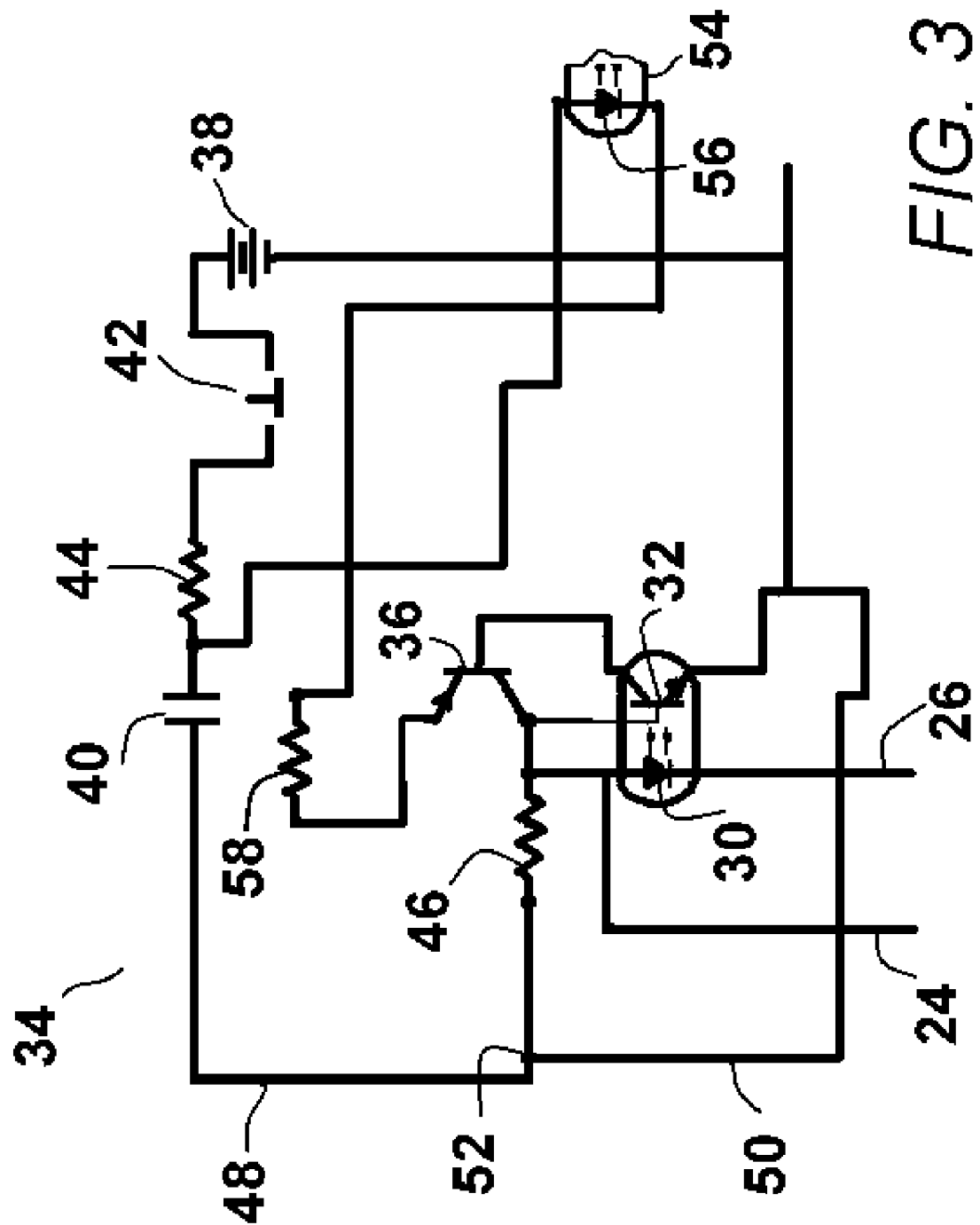
FIG. 3 is an enlarged view of the regenerative section of the circuit breaker shown in FIG. 1.

Referring to FIG. 3, in conjunction with FIG. 2 and FIG. 1, it can be seen that the first optoisolator 22 contains a first infrared LED 30. The first infrared LED 30 receives the two leads 24, 26 from the power input section 12. Accordingly, the first infrared LED 30 receives the voltage difference created by the threshold resistor 20.

Under normal operating conditions, the first infrared LED 30 will not conduct. This is due to the voltage differential across the first infrared LED 30 being less than the operational threshold voltage of the first infrared LED 30. However, if the voltage across the first infrared LED 30 surpasses its threshold voltage, then the first infrared LED 30 will light and the first optoisolator 22 activates. As will be later explained, the activation of the first optoisolator 22 is the trip for the overall breaker circuit design 10. It will therefore be understood that the tripping threshold for the overall breaker circuit design 10 can be varied by changing the resistance of the threshold resistor 20. Accordingly, the trip current for the overall circuit breaker design 10 can be customized for many applications simply by selecting the appropriately valued threshold resistor 20.

The first optoisolator 22 is preferably a 4N33 type optoisolator. Accordingly, the first optoisolator 22 contains an NPN transistor 32 in addition to the first infrared LED 30. A regenerative circuit 34 is joined to the first optoisolator 22. The regenerative circuit 34 includes a PNP transistor 36. The base of the PNP transistor 36 is coupled to the collector of the NPN transistor 32 in the first optoisolator 22. Alternatively, the base of the NPN transistor 32 in the first optoisolator 22 is coupled to the collector of the PNP transistor 36.

A first DC power supply 38 is provided. The power supply 38 is coupled to both the collector of the PNP transistor 36 and the base of the NPN transistor 32. A capacitor 40 is disposed between the first DC power supply 38 and the two transistors 32, 36, as is a reset switch 42. A first resistor 44 is disposed between the reset switch 42 and the capacitor 40. A second resistor 46 is disposed between the capacitor 40 and the two transistors 32, 36. The lead 48 between the capacitor 40 and the second resistor 46 also connects to a ground lead 50 at a node 52. The emitter of the NPN transistor 32 in the first optoisolator 22 and the first DC power supply 38 are also connected to the ground lead 50.

Figure 4:
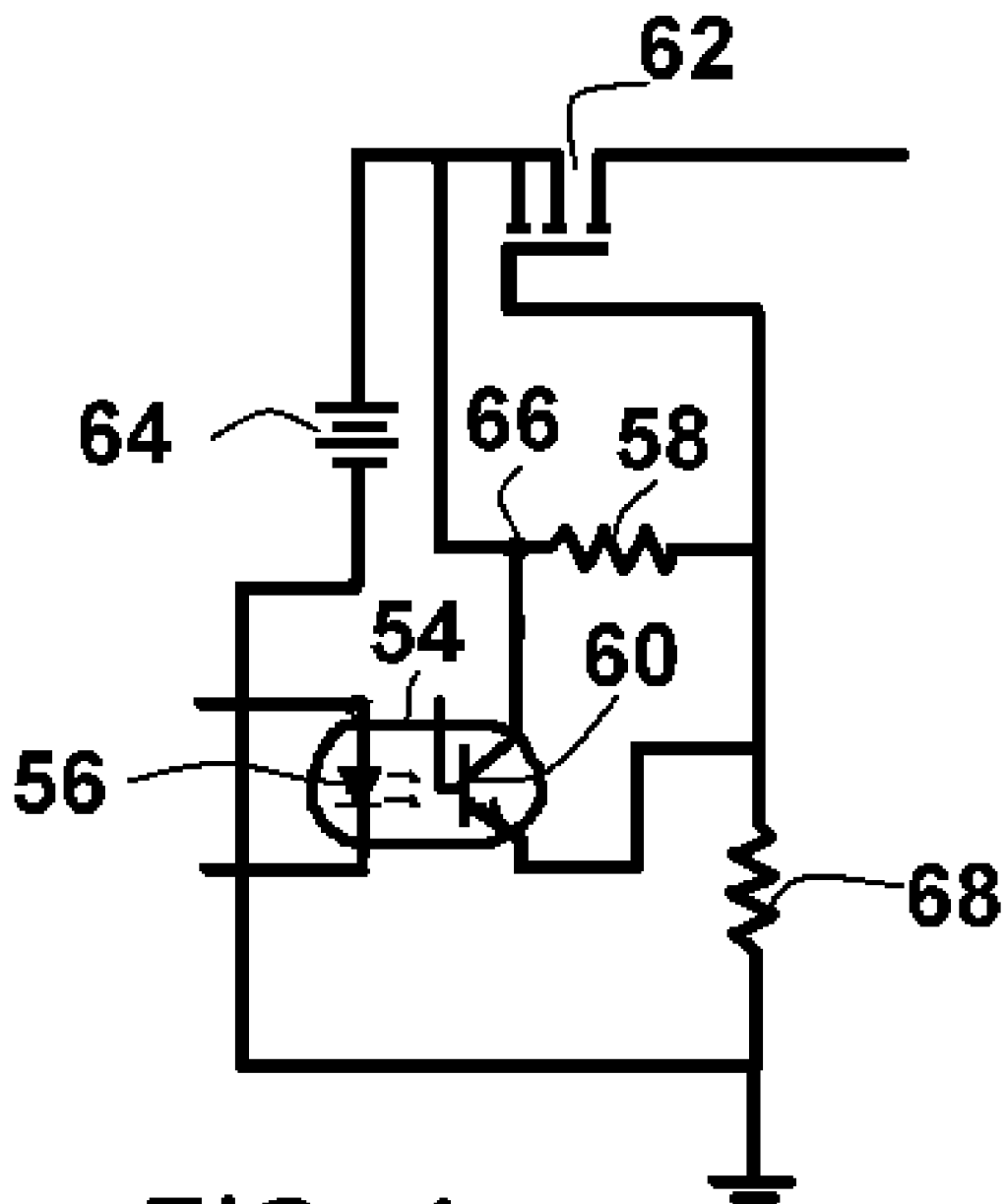
FIG. 4 is an enlarged view of the power output section of the circuit breaker shown in FIG. 1.

Referring to FIG. 3 in conjunction with FIG. 4, it will be understood that there is a second optoisolator 54 in the power output section 14 of the circuit breaker design 10. The second optoisolator 54 contains a second infrared LED 56. The second infrared LED 56 is connected to a lead 58 that starts between the first resistor 44 and the capacitor 40. The opposite side of the second infrared LED 56 is connected to the emitter of the PNP transistor 36 with an intervening third resistor 58.

The regenerative circuit 34 acts as an "on" latch that keeps the circuit breaker design 10 tripped even if the monitored incoming voltage again drops to acceptable levels. When a high differential voltage is detected, the first infrared LED 30 lights. This causes the NPN transistor 32 within the first optoisolator 22 to conduct. The regenerative circuit 34 enhances the input signal to the NPN transistor 32 and forces the NPN transistor 32 to conduct at its maximum capability. The NPN transistor 32 will continue to conduct at its maximum, even if the first infrared LED 30 in the first optoisolator 22 were to shut off. As such, the NPN transistor 32 in the first optoisolator 22 is latched on and acts as a memory. The NPN transistor 32 can only be returned to its non-conducting condition by pressing the reset switch 42 and separating the first NPN transistor 32 from the first DC power supply 38.

When the NPN transistor 32 in the first optoisolator 22 is conducting, the amplified version of the first NPN transistor's current flows through the second NPN transistor 60 in the second optoisolator 54. This provides the needed input signal for the power handling stage of the overall circuit breaker design 10.

Referring to FIG. 4, it can be seen that the power output section 14 of the circuit breaker design 10 includes a power transistor 62. The power transistor 62 is preferably a PMOS power transistor that is in series with the voltage output Vout. The source of the power transistor 62 is coupled to a second DC power supply 64. The drain of the power transistor 62 is coupled to the DC power load being monitored. The power transistor 62 selectively changes between an on state and an off state depending upon whether or not the power transistor 62 is powered. In its on state, the power transistor 62 acts as a closed switch and enables current to flow through the circuit breaker design 10. When the power transistor 62 is in its off state, the circuit breaker design 10 is tripped and no current flows.

The collector of the second NPN transistor 60 connects to a node 66 between the second DC power supply 64 and the source of the power transistor 62. The node 66 is also shunted to the gate of the power transistor 62 via a fourth resistor 58. The gate of the power transistor 62 also interconnects with the emitter of the second NPN transistor 60 and the ground lead 50. The third resistor 58 and the fourth resistor 68 create a voltage divider that provides the proper voltage to fully transition the power transistor 62 to its on state when the second NPN transistor 60 is off. When the second infrared LED 56 in the second optoisolator 54 is activated, the second NPN transistor 60 turns on. This changes the voltage divider and deactivates the power transistor 62 to its off state. Consequently, the output voltage flowing through the power transistor 62 falls to zero. The overall circuit breaker design 10 therefore stops the flow of electricity until the circuit breaker design 10 is reset by pressing the reset switch 42.

The circuit breaker design 10 is solid state and is capable of operating at hundreds of volts DC. The current carrying capabilities of the circuit breaker design 10 are primarily determined by the power rating of the power transistor 62. Most of the other components are isolated from the voltage being monitored. Furthermore, the tripping threshold for the circuit breaker design 10 can be altered simply by changing the resistance of the threshold resistor 20.

In the embodiment of the circuit breaker design 10 shown and described, the circuit breaker design 10 has a very rapid response time. Accordingly, the circuit breaker design 10 will trip the moment a voltage over the selected threshold is selected. However, the circuit breaker design 10 can be made with a slowed response time by adding a simple delay circuit to the design. The delay circuit can operate from one of the isolated power supplies within the circuit breaker design 10.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A solid state circuit breaker for disrupting direct current should the direct current have a voltage that surpasses a predetermined threshold voltage, said circuit breaker comprising:

a power transistor in series with said direct current, wherein said power transistor has an on state and an off state, and wherein said power transistor disrupts said direct current only when in said off state;

a first optoisolator that contains a first LED and a first transistor, wherein said first LED has a minimum operating voltage;

a threshold resistor through which said direct current passes, wherein said threshold resistor creates a voltage differential, and wherein said voltage differential is supplied to said first LED and causes said first LED to activate said first transistor only if said voltage differential is greater than said minimum operating voltage;

wherein said first transistor causes said power transistor to change from said on state to said off state when activated; and a regenerative circuit having a reset switch, wherein said regenerative circuit maintains said first transistor in an activated state, once activated, even if said voltage differential drops below said minimum operating voltage.

2. The circuit breaker according to claim 1, wherein said regenerative circuit deactivates said first transistor when said reset switch is open.

3. The circuit breaker according to claim 1, further including a first DC power supply for powering said first transistor.

4. The circuit breaker according to claim 3, further including a second optoisolator having a second LED and a second transistor, wherein said second LED is activated by said first transistor.

5. The circuit breaker according to claim 4, wherein said second transistor changes said power transistor between said on state and said off state.

6. The circuit breaker according to claim 5, further including a second DC power supply for powering said second transistor and said power transistor.

7. A solid state circuit breaker for disrupting direct current should the direct current have a voltage that surpasses a predetermined threshold voltage, said circuit breaker comprising:

a power transistor in series with said direct current, wherein said power transistor has an on state and an off state, and wherein said power transistor disrupts said direct current only when in said off state;

a second optoisolator that alters said power transistor between said on state and said off state, wherein said second optoisolator contains a second transistor;

a first optoisolator that selectively controls said second optoisolator, wherein said first optoisolator contains a first transistor;

a first DC power supply for powering said first transistor;

a second DC power supply for powering said second transistor; and a resistive element through which said direct current passes, wherein said resistive element creates a voltage differential, and wherein said voltage differential activates said first optoisolator when said voltage differential surpasses a predetermined threshold voltage.

8. The circuit breaker according to claim 7, wherein said resistive element includes at least one resistor.

9. The circuit breaker according to claim 7, wherein said first optoisolator contains a first LED, wherein said first LED has a minimum operating voltage that is equal to said predetermined threshold voltage.

10. The circuit breaker according to claim 9, wherein said second optoisolator has a second LED, wherein said second LED is activated by said first transistor.

11. The circuit breaker according to claim 10, wherein said second transistor changes said power transistor between said on state and said off state.

12. The circuit breaker according to claim 11, further including a regenerative circuit having a reset switch, wherein said regenerative circuit maintains said first transistor in an activated state, once activated, even if said voltage differential drops below said predetermined threshold voltage.

13. The circuit breaker according to claim 12, wherein said regenerative circuit deactivates said first transistor when said reset switch is open.

14. A solid state circuit breaker for disrupting direct current should the direct current have a voltage that surpasses a predetermined threshold voltage, said circuit breaker comprising:

a power transistor in series with said direct current, wherein said power transistor disrupts said direct current only when in an off state;

a second optoisolator that controls said power transistor;

a first optoisolator that controls said second optoisolator, wherein said first optoisolator contains a diode and said first optoisolator activates when a voltage is received by said diode in excess of said predetermined threshold voltage; and a first DC power supply for powering said first optoisolator; and a second DC power supply for powering said second optoisolator.

15. The circuit breaker according to claim 14, further including a threshold resistor through which said direct current passes, wherein said threshold resistor creates a voltage differential, and wherein said voltage differential activates said first optoisolator when said voltage differential surpasses said predetermined threshold voltage.

* * * * *